US008069189B2

(12) United States Patent  (10) Patent No.: US 8,069,189 B2
Asada  (45) Date of Patent: Nov. 29, 2011

(54) PORTABLE TERMINAL

(75) Inventor: Maiko Asada, Tokyo (JP)

(73) Assignee: NEC Corporation, Tokyo (JP)

( * ) Notice: Subject to any disclaimer, the term of this patent is extended or adjusted under 35 U.S.C. 154(b) by 390 days.

(21) Appl. No.: 11/581,586

(22) Filed: Oct. 17, 2006

(65) Prior Publication Data

US 2007/0097429 A1   May 3, 2007

(30) Foreign Application Priority Data

Oct. 27, 2005   (JP) .................... 2005-312133

(51) Int. Cl.
    *G06F 17/00* (2006.01)
(52) U.S. Cl. ........ 707/805; 707/707; 707/711; 707/716; 707/726; 707/781
(58) Field of Classification Search .......... 707/707, 707/711, 716, 726, 732, 781, 805
    See application file for complete search history.

(56) References Cited

U.S. PATENT DOCUMENTS

| | | | |
|---|---|---|---|
| 6,192,258 B1 * | 2/2001 | Kamada et al. | 455/566 |
| 6,829,607 B1 * | 12/2004 | Tafoya et al. | 1/1 |
| 7,058,417 B2 | 6/2006 | Jeong | |
| 2002/0107930 A1 | 8/2002 | Itoh | |
| 2004/0116105 A1 | 6/2004 | Jeong | |
| 2004/0122838 A1 | 6/2004 | Gruen | |
| 2005/0022134 A1 | 1/2005 | Tokashiki | |

FOREIGN PATENT DOCUMENTS

| | | |
|---|---|---|
| CN | 1507298 A | 6/2004 |
| JP | 11-249785 | 9/1999 |
| JP | 2000-285080 | 10/2000 |
| JP | 2001-112058 | 4/2001 |
| JP | 2003-016003 | 1/2003 |
| JP | 2004-080820 | 3/2004 |
| JP | 2005-209174 | 8/2005 |
| WO | WO 2004/017188 A1 | 2/2004 |

OTHER PUBLICATIONS

European search report dated Sep. 4, 2008.
Japanese Office Action dated Feb. 22, 2011 (with an English translation).
Yamamoto (http://www.forest.impress.co.jp/article/1998/11/10/almail.html) with English translation.

* cited by examiner

*Primary Examiner* — Sana Al Hashemi
(74) *Attorney, Agent, or Firm* — McGinn IP Law Group, PLLC

(57) ABSTRACT

A portable terminal, which has mail function, allows a user to input a destination address of mail by selecting the address from the address list with easy operation by displaying all of information for input operation of the destination address with other information for mail creation such as subject and message of the mail.

22 Claims, 4 Drawing Sheets

PORTABLE TERMINAL

BACKGROUND OF THE INVENTION

1. Field of the Invention

The present invention relates to a portable terminal such as a cellular phone, a PHS (Personal Handy Phone System) or a PDA (Personal Digital Assistant) including a mail transmission function including e-mail, and in particular, to the portable terminal that allows a user to easily input a destination address of mail.

2. Description of the Related Art

Conventionally, a mail function is available on a portable terminal such as a cellular phone or a PHS.

Such a portable terminal includes an operating portion and an input portion allowing a user to input a character string in order to create a message body of a mail. When inputting a destination address, the user can input it by using the operating portion or input portion as with the message body of mail because mail address consists of a character string. However, it is cumbersome that inputting the destination address character by character in this way as with inputting the message body.

Japanese Patent Laid-Open No. 11-249785 has proposed that the destination addresses stored in an address book or the like should be sequentially displayed on a display to select a desired destination address by referring thereto. The proposed method simplifies the user's operation of inputting the destination addresses of mail to be sent out to the desired destination without memorizing the addresses of the other parties each time.

Japanese Patent Laid-Open No. 2000-285080 has further proposed that the functions of operation keys of the operating portion should be customized to facilitate operations.

In any of the methods, the user inputs the destination address on a separate screen for inputting destination address from a screen for inputting message body of a mail.

For that reason, when the user creates and transmits the mail by using such a portable terminal, the user needs to be thoroughly familiar with many steps of an operating procedure for mail creation and transmission including a method of calling the destination address input screen. More specifically, even with the functions of referring to the addresses in the address book and customizing the operation keys as in the aforementioned documents, the operations involves switching of different screens such as a screen for inputting message body or a screen for inputting destination addresses, and such switching operation of screens back and forth are so complicated that they are difficult especially for an elderly person, a physically handicapped person and others.

SUMMARY OF THE INVENTION

The present invention has been proposed to solve the above-mentioned problems in view of the circumstances, and an object to provide a portable terminal that allows a user to easily input a destination address of mail.

A user can thereby input a destination mail address to a text box for input of destination mail addresses in a same mail creation screen. Accordingly, it is no longer necessary to learn a cumbersome operating procedure for mail creation and transmission including a switching of the screens for input of destination mail addresses and for input of message body.

BRIEF DESCRIPTION OF THE DRAWINGS

The above and other purposes, features and advantages of the present invention will be more apparent from the following detailed description when taken in conjunction with the accompanying drawings wherein.

DETAILED DESCRIPTION OF THE EXEMPLARY ASPECTS

Figure 1:
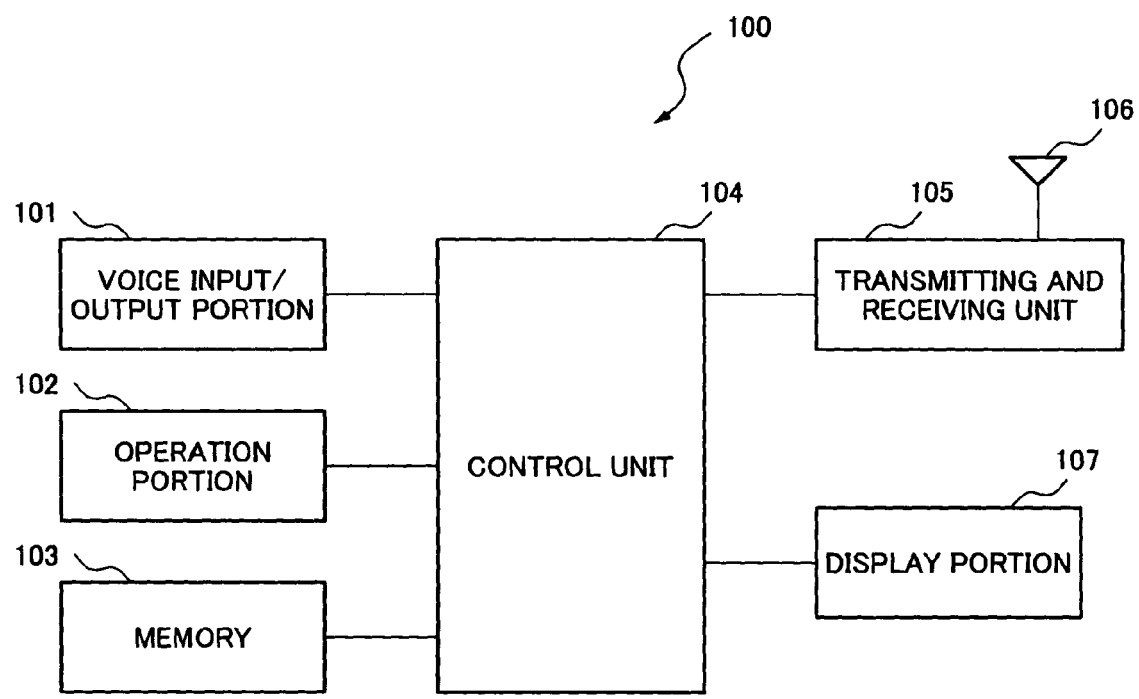
FIG. 1 is a block diagram of a cellular phone according to an embodiment of the present invention.

FIG. 1 is a block diagram showing a configuration of a portable terminal exemplified by a cellular phone according to an embodiment of the present invention.

A cellular phone 100 of FIG. 1 includes a voice input/output portion 101, an operation portion 102, a memory 103, a control unit 104, a transmitting and receiving unit 105, an antenna 106 and a display portion 107. The voice input/output portion 101 includes a microphone and a speaker so as to input and output voice or sound. The operation portion 102 includes multiple operation keys such as a numeric keypad. The memory 103 stores programs and various kinds of data. The control unit 104 executes the programs stored in the memory 103 so as to control each individual component of the cellular phone 100, control the entire system and perform processing related to this embodiment as described later. The transmitting and receiving unit 105 wirelessly transmits and receives voice, mail and data via the antenna 106.

The voice input/output portion 101 is an example for voice input/output means. Similarly, each of the operation portion 102, memory 103, control unit 104, transmitting and receiving unit 105 (antenna 106) and display portion 107 are examples each for operating means, storage means, control means, sending means and display means.

Figure 4:
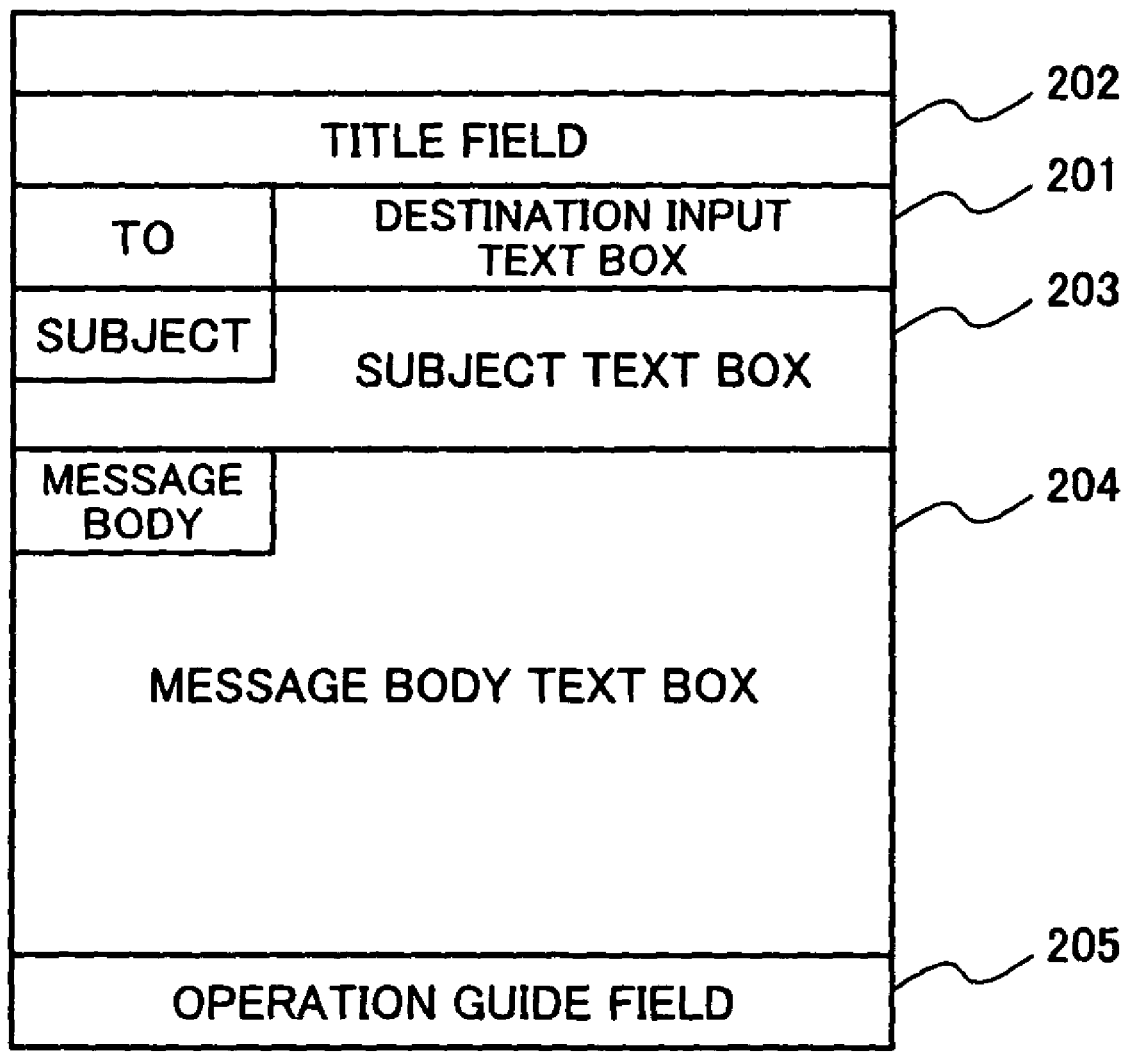
FIG. 4 is a diagram showing the operation screen layout of the cellular phone according to the embodiment of the present invention.

FIG. 4 shows the screen layout of mail creation screens displayed on the display portion 107. A field indicated by a reference numeral 202 of FIG. 4 is a title field, which shows a title of the screen displayed on the display portion 107. For example, the title field 202 displays a title such as "New Mail" or "Reply Mail". The field indicated by the reference numeral 201 is a destination input text box, which displays information for a destination input operation such as a destination name or destination address or name of an address list for instance. The information displayed in the destination text box 201 is referred to as destination input information in the description hereunder. The field indicated by a reference numeral 203 is a subject text box, which is used; to display and input a mail subject. The field indicated by a reference numeral 204 is a message body text box, which is used by a user to input a message body of mail. The field indicated by a reference numeral 205 is an operation guide field, which displays effective operation keys on a displayed screen.

Figure 2:
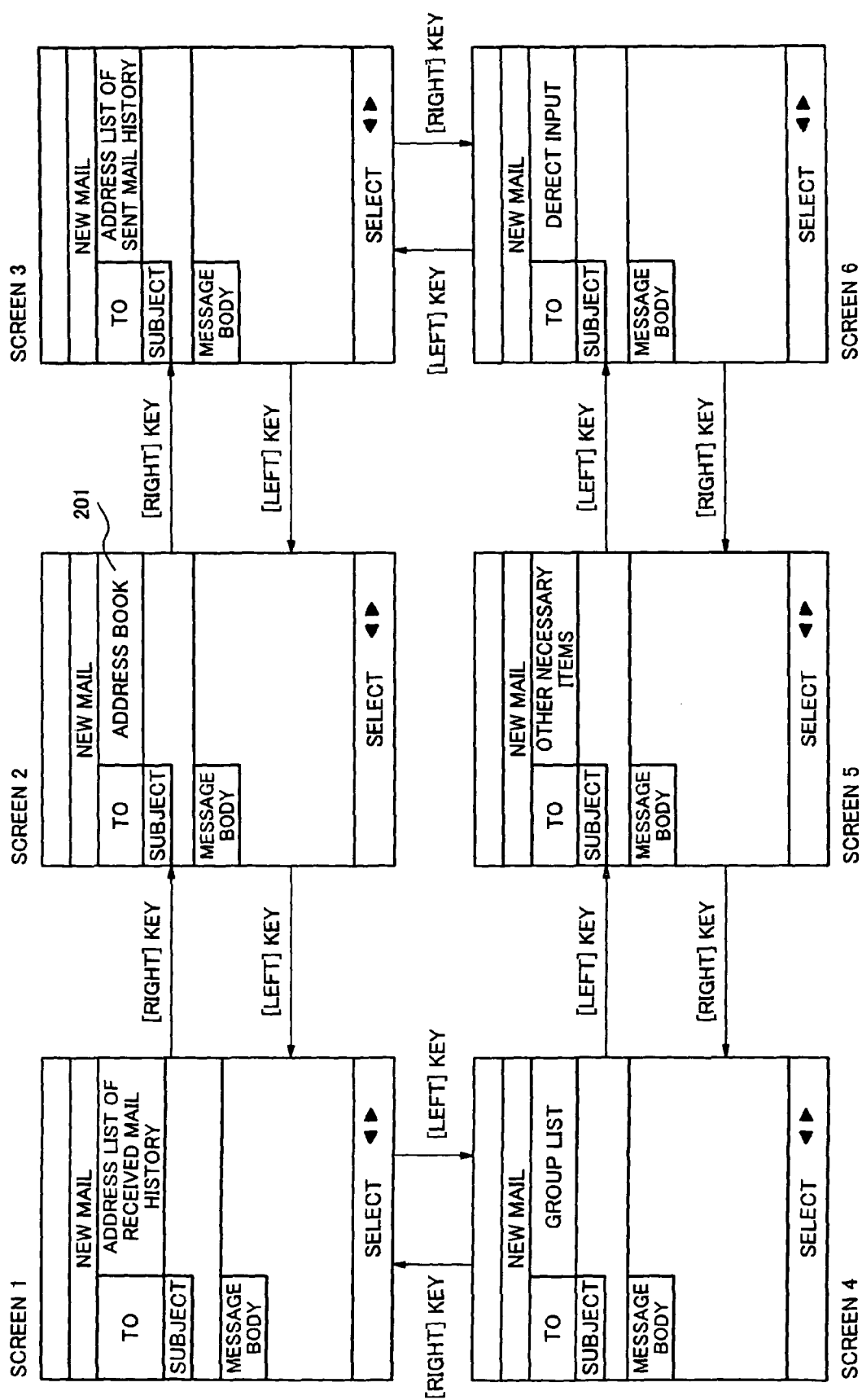
FIG. 2 is a diagram showing transition of operation screens of the cellular phone according to the embodiment of the present invention.
Figure 3:
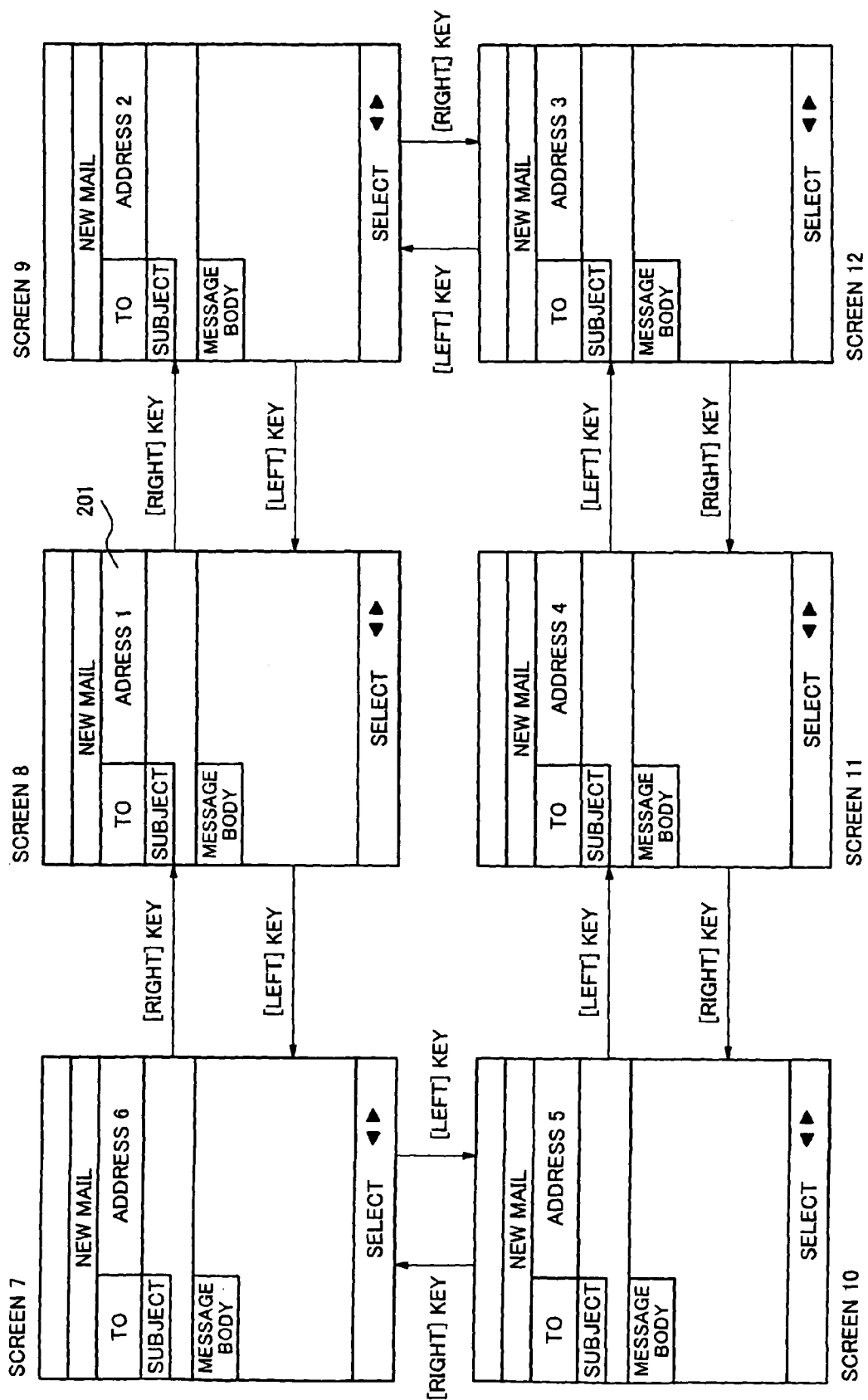
FIG. 3 is a diagram showing another transition of operation screens of the cellular phone according to the embodiment of the present invention.

FIG. 2 and FIG. 3 show the screens displayed on the display portion 107 when creating mail by way of a multiple address lists input and a single address list input respectively. The multiple address lists input and the single address list input are the methods of inputting a destination address according to the embodiment of the present, invention. The multiple address lists input is the method of inputting a destination address wherein one of multiple address lists stored in the memory 103 is selected and referred to, and an address is selected from the selected address list. The single address list input is the method of inputting a destination wherein a predetermined address list is referred to and a destination address is selected from the predetermined address list. FIG. 2 and FIG. 3 show transitions of an operation screens on input in the cases of the multiple address lists input and the single address list input respectively.

The multiple address lists input will be described first.

The six screens shown in FIG. 2 indicate screen transitions in an operating process of inputting a destination address using the multiple addresses lists input in creating new mail. All the six screens are corresponding to a screen layout shown in the aforementioned FIG. 4. On the six screens of FIG. 2, the title field 202 indicates "New Mail" in order to show that it is the example screen for creating new mail. On the six screens of FIG. 2, the destination text box 201 indicates an address list name selected on each of the screens such as "Address List of Received Mail History" or "Address Book" or "Direct Input" for inputting destination address character by character from the operation portion 102 without referencing any address list. The six screens sequentially transits one to next by the user operation as described later. The user changes the six screens shown in FIG. 2 checking an indication in the destination text box 201 and selects the address list, direct input or the like.

Next, from an aspect of the user's operations, the multiple address lists input will be described with reference to FIG. 2.

The user operates the operation portion 102 to start creating mail by using the multiple address lists input. In response to the operation of the operation portion 102 by the user, the control unit 104 controls the display portion 107 to display a start screen (screen 2) of mail creation using the multiple address lists input.

The destination text box 201 of a screen 2 indicates "Address Book." So the destination input information of the screen 2 is "Address Book."

When "Address Book" is displayed as the destination input information, it indicates that the address book is selected as the address list for searching and inputting the destination of the mail. "Address Book" is stored in the memory 103 in the cellular phone 100. In general, the information stored by an address book function of the cellular phone contains a lot of information such as not only the mail address but also a name, an appellation, a telephone number, a FAX number, a company name and a division name of the company. For fast accessing to the address list, the control unit 104 may store data of address list in advance separately from the address book in the memory 103. For example, the control unit 104 may extract minimum information required for inputting destination of mail such as mail addresses and corresponding names. Or for instance, the control unit 104 may have indexes to the address book in memory 103 for fast access in advance.

The user starts the destination address input using "Address Book" in the operation of the multiple address lists input by selecting the destination text box 201 in the screen 2 as an input field. Selecting the destination text box 201 as an input field means that the user operates the operation portion 102 and moves a pointer or a cursor to the destination text box 201 from any other field in the screen 2 so as to get the destination text box 201 ready for data input or data selection.

Next, the user searches for a desired mail address in the address book with selection keys or other keys of the operation portion 102. In response to the user's operation, the control unit 104 controls the display portion 107 to display a searched mail address of the address book in the destination text box 201. The search may be a process of sequentially displaying the mail addresses included in the address book in response to the user's operation of the selection keys. Or it may also be a process of searching from the address book for the mail address which has a character or a character string fully or partially matching with the character or the character string inputted by the user from the operation portion 102. Further, it may also be a process of searching from the address book for the mail address whose appellation, registered name or other information related to the mail address has a character or a character string fully or partially matching with the character or the character string inputted by the user from the operation portion 102.

When the desired address is searched and shown in the destination text box 201, the user finalizes the destination address by operating the operation portion 102. The display portion 107 displays the finalized and entered destination in the destination text box 201. Responding to the use's operation of sending out the mail from operation portion 102 after inputting the subject and message body, the control unit 104 sends out the mail to the destination address via the transmitting and receiving unit 105 and the antenna 106.

Responding to the right key of the operation portion 102 on screen 2 when the destination text box 201 is selected as an input field, the operation screen changes from the screen 2 to a screen 3. To be more specific, when the user inputs the right key of the operation portion 102, the control unit 104 controls the display portion 107 to change the destination input information from "Address Book" to "Address list of sent mail history" as shown on the screen 3 of FIG. 2.

When "Address list of sent mail history" is displayed as the destination input information, it indicates that address list of sent mail history is selected as the address list for inputting destination address. "Address list of sent mail history" is an address list extracted destination addresses from mail transmitted in the past from the cellular phone 100 and stored in the memory 103. In the multiple address lists input, the control unit 104 may give indexes to the sent mail history in memory 103 for the sake of fast search and access of the sent mail history. Or the control unit 104 may store the destination addresses extracted from the sent mail history in the memory 103 and arranged into data structure for fast access to the addresses in the list for search operation described later.

The user starts the destination address input using the address list of sent mail history by selecting the destination text box 201 in the screen 3 as an input field. The user searches the mail addresses in the address list of sent mail history by pressing the selection keys or other keys of the operation portion 102, and selects one of the destination addresses from the address list of sent mail history.

The search in the address list of sent mail history may be a process of sequentially displaying the mail addresses included in the header part of mail in the sent mail history by the user's operation of the selection key. It may also be a process of searching for the mail address from the sent mail history having a character or a character string fully or partially matching with the character or the character string inputted by the user from the operation portion 102. Further, it may also be a process of searching for the mail address from the sent mail history combined with the address book, a corresponding appellation, a corresponding registered name or other corresponding information which has a character or a character string fully or partially matching with a certain character or character string inputted by the user from the operation portion 102.

When the desired address is searched and shown in the destination text box 201, the user finalizes the destination address by operating the operation portion 102. Then control unit 104 displays the selected destination address in the destination text box 201 of screen 3 on the display portion 107 indicating that the selected address is finalized.

Responding to the user's operation for sending out the mail by operation portion 102 after inputting the subject and message body, the control unit 104 transmits the mail to the address via the transmitting and receiving unit 105 and the antenna 106.

Responding to the right key of the operation portion 102 on screen 3 when the destination text box 201 is selected as an input field, the operation screen changes from the screen 3 to a screen 6. To be more specific, when the user inputs the right key, the control unit 104 controls the display portion 107 to change the displayed destination input information from "Address list of sent mail history" to "Direct Input."

In "Direct Input," the user inputs the destination mail address character by character. The user starts the destination address input using direct input by selecting the destination text box 201 in the screen 6 as an input field. After starting the direct input, the user inputs the destination mail address character by character to the destination text box 201 by operating the operation portion 102.

Responding to the left key of the operation portion 102 on screen 2 when the destination text box 201 is selected as an input field, the operation screen changes from the screen 2 to a screen 1. To be more specific, when the user inputs the left key, the control unit 104 controls the display portion 107 to change the displayed destination input information from "Address Book" to "Address list of received mail history."

When "Address list of received mail history" is displayed as the destination input information, it indicates that an address list of received mail history is selected as the address list for inputting destination address. "Address list of received mail history" is a list of addresses included in mail received by the cellular phone 100 in the past and stored in the memory 103. The addresses included in the received mail are the addresses of the destinations and sources including carbon copies of the received mail. In the multiple address lists input, the control unit 104 may store the addresses in memory 103 extracted from the received mail history and arranged into data structure for fast accessing to the address data in the list for search operation described later. The control unit 104 may also give indexes to the received mail history, or store data in memory 103 separately from the received mail history with different data structure from the received mail history for the search described later.

The user starts the destination address input using the address list of received mail history by selecting the destination text box 201 in the screen 1 as an input field. The user searches the mail addresses in the address list of received mail history by operating the selection key or other keys of the operation portion 102, and selects one of the mail addresses included in sending mail history list stored in the memory 103.

The search in the address list of received mail history may be a process of sequentially displaying the mail addresses included in mail of the receiving mail history by the user's operation of the selection key. It may also be a process of searching for the mail address from the receiving mail history having a character or a character string fully or partially matching with the character or the character string inputted by the user from the operation portion 102. Further, it may also be a process of searching for the mail address, from the sending mail history combined with the address book, to a corresponding appellation, a corresponding registered name or other corresponding information having a character or a character string fully or partially matching with a certain character or character string inputted by the user from the operation portion 102.

When the desired address is searched and shown in the destination text box 201, the user finalizes the destination address by operating the operation portion 102. Then control unit 104 displays the selected destination address in the destination text box 201 of screen 3 on the display portion 107 indicating that the selected address is finalized.

Responding to the user's operation for sending out the mail by operation portion 102 after inputting the subject and message body, the control portion 104 transmits the mail to the address via the transmitting and receiving unit 105 and the antenna 106.

Responding to a left key of the operation portion 102 on screen 1 when the destination text box 201 is selected as an input field, the operation screen changes from the screen 1 to a screen 4. To be more specific, when the user inputs with the left key on screen 1 the control portion 104 controls the display portion 107 to change the displayed destination input information from "Address List of Received Mail History" to "Group List." A group list contains the mail addresses for sending mail to a grouped address which is a plurality of destinations.

The user operates the cellular phone 100 and constructs the group list in the memory 103 in advance. The user starts the destination address input using the group list by selecting the destination text box 201 in the screen 4 as an input field. Next, the user selects one of the grouped addresses in the group list stored in the memory 103 by operating the selection key or other keys of the operation portion 102. When the desired address is searched and shown in the destination text box 201, the user finalizes the destination address by operating the operation portion 102. The display portion 107 displays the finalized and entered destination address in the destination text box 201. Responding to the use's operation of sending out the mail from operation portion 102 after inputting the subject and message body, the control unit 104 transmits the mail to the addresses via the transmitting and receiving unit 105 and the antenna 106.

The user calls a screen 5 from the screen 4 or screen 6 by same operation with the other screen transition. In the screen 5, the user inputs destination address using another address list or direct input. The multiple address lists input is capable of supporting a plurality of address lists or ways of input more than five by inserting further screens as the screen 5. For instance, the multiple address list input has a further screen for an address list for the user to create mail for reply to received mail. The address list will be an address list extracted from the received mail to be replied.

As shown in FIG. 2, the screens from 1 to 6 are connected like a ring and each screen transits to/from next screen bidirectional. For that reason, it is possible for the user to reach any of six screens from any other screens by pressing the key of one direction (one of the right and left keys) of the selection keys. To be more specific, when the user operates the operation portion 102 and presses the key of one direction more than one time, the destination input information of the destination text box 201 sequentially changes from one to next. When the user presses the key of same direction on the last screen, the control unit 104 controls the display portion 107 to display the first screen again.

The user creates the mail by inputting the subject and message body of the mail from the operation portion 102 and also inputting the destination as described above. Responding to the use's operation of sending out the mail from operation portion 102 after mail creation, the control unit 104 transmits the mail to the address via the transmitting and receiving unit 105 and the antenna 106.

Next, the single address list input will be described using FIG. 3.

In the 'case' of the single address list input, the user starts destination address input with the status that a predetermined address list has been selected. So the single address list input allows the user to eliminate the operation of selecting the address list used for input of the destination address compared to the operations of the multiple mail address lists input, such as operations for selecting an address list from "Address Book," "Address list of sent mail history" and "Address list of received mail history."

To be more specific, in the case of the single address list input, the user's operation for changing from the screens 1 to 6 corresponding to "Address Book," "Outgoing History" and "Incoming History" in the multiple address lists input is eliminated. The predetermined address list is selected from the beginning of the single address list input operation, and the user start the operation of the single address list input, not from selecting an address list but from selecting a desired mail address in the predetermined address list.

It is possible for the user to use any address list as predetermined address list, such like the address lists described in the explanation of the multiple address list input aforementioned or the address list which the user establishes in advance.

The following description premises that the user has set up an address list in the memory 103 as predetermined address list for the single address list input in advance. In FIG. 3, the predetermined address list stores six addresses for example. However the number of addresses is not limited to six. They may also be less than six or more than six addresses.

The six screens shown in FIG. 3 indicate the screen transitions in the operation of single address list input when creating new mail. All the six screens have same layout with the screen layout shown in the aforementioned FIG. 4. On the six screens of FIG. 3, the title field 202 indicates "New Mail." in order to show that it is an example screens for creating new mail. On the six screens of FIG. 3, the destination text box 201 indicates the currently selected address from the addresses 1 to 6 corresponding to the screen 1 to 6. The six screens make transitions sequentially according to the operation by the user described later. The user changes the six screens shown in FIG. 3 checking addresses shown in the destination text box 201 and selects the desired address for destination address of the mail which the user is creating.

Next, the single address list input will be described according to the user's operations with reference to FIG. 3.

The user starts the destination address input by operating the operation portion 102. In response to the operation of the operation portion 102 by the user, the control unit 104 controls the display portion 107 to display the start screen (screen 8) of the mail creation using the single address list input.

On the screen 8, the user starts the single address list input by selecting the destination text box 201 as the input field via operation portion 102. The destination text box 201 on the screen 8 indicates "Address 1" which is one of the addresses set by the user on the predetermined address list stored in the memory 103 in advance. "Address 1" is the destination input information on the screen 8.

For searching other addresses in the predetermined address list for the single address input, the user presses the right key when the destination text box 201 is selected. Responding to the user's operation of pressing the right key when the destination text box 201 is selected, the screen displayed on the display portion 107 changes from the screen 8 to a screen 9. To be more specific, the control unit 104 controls the display portion 107 to change the displayed destination input information from "Address 1" to "Address 2".

Subsequently, when the user searches further addresses in the predetermined address list for the single address input, the user presses the right key of the operation portion 102 when the destination text box 201 is selected. Responding to the user's operation, the screen displayed on the display portion 107 changes from the screen 9 to a screen 12. To be more specific, the control unit 104 controls the display portion 107 to change the displayed destination input information from "Address 2" to "Address 3".

On the other hand, when the user inputs with the left key of the operation portion 102 when the destination input text box 201 is selected on the screen 8, the screen displayed on the display portion 107 changes from the screen 8 to a screen 7. To be more specific, the control unit 104 controls the display portion 107 to change the displayed destination input information from "Address 1" to "Address 6" in response to the operation by the user.

The user can change the screen displayed on the display portion 107 from the screen 7 to a screen 10 by the same operation and switch the destination input information from "Address 6" to "Address 5."

As shown in FIG. 3, the screens between the screens 7 and 12 are connected like a ring capable of bidirectional transitions from one to next. For that reason, it is possible for the user to search any address in the predetermined address list by pressing a key of one direction (one of the right and left keys) of the selection keys, and changing screens until reaching a screen on which the desired address is indicated in the destination text box 201.

When the desired address is searched and shown in the destination text box 201, the user finalizes the destination address by operating the operation portion 102. The display portion 107 displays the finalized and entered destination address in the destination text box 201. Responding to the use's operation of sending out the mail from operation portion 102 after inputting the subject and message body, the control unit 104 transmits the mail to the address via the transmitting and receiving unit 105 and the antenna 106.

As described above, according to the embodiment, the portable terminal having a mail transmission function such as the cellular phone 100 includes the memory 103, operation portion 102, display portion 107 and control unit 104. The memory 103 stores the information for use in displaying and selecting multiple destination mail addresses. To be more precise, the memory 103 stores mail addresses extracted from various address lists such as the address book, the sent and received mail history for searching processing of destination mail address. The control unit 104 controls the display portion 107 to switch the information displayed in the destination text box 201 on the screen. When the user selects and finalizes the mail address displayed in the destination text box 201, inputs the subject and message body of the mail and performs the transmitting operation with the operation portion 102, the control portion 104 transmits the mail to the address via the sending and receiving portion 105 and the antenna 106.

As indicated in the example, the information for input operations of the destination address is displayed simultaneously with information for mail creation such as inputting subject or inputting message body. To be more specific, the control unit 104 controls the display portion 107 to display the destination input information on the same screen of the mail creation screen. Furthermore, the control unit 104 controls the display portion 107 to display the address list name or the destination address currently selected by the user by operating the operation portion 102 as destination input information in the destination text box 201 of the display portion 107.

The address list used in the multiple address lists input or the single address list input, used for searching and selecting desired address by the user, composes at least one of the address lists including an address list of an address book, an address list extracted from sent mail history, an address list extracted from received mail history, an address list of grouped address, an address list of user established.

The embodiment of the present invention has the effects to allow the user, especially for the user of an elderly person or a physically handicapped person, to input the destination address easily and quickly.

It is also possible to customize various settings in the same screen configuration by allowing extended settings by the user.

According to the embodiment, it has been explained that a selecting operation was performed with the right and left keys of operating the operation portion 102. However, it may also be performed by using the up and down keys or by using other keys.

In the multiple address lists input or single address list input, an address searched and displayed in the destination text box 201 may be ordered specified by the user or sorted by a rule defined by the user.

This application is based on Japanese Patent Application No. JP 2005-312133 filed on Oct. 27, 2005, and including a specification, claims, drawings and summary. The disclosure of the above Japanese Patent Application is incorporated herein by reference in its entirety.

What is claimed is:

1. A portable terminal including a function for transmitting a mail, said portable terminal comprising:
   display means;
   storage means for storing an address list including a plurality of mail addresses;
   inputting means for receiving key operations by a user of the portable terminal for searching and entering a destination mail address; and
   control means for searching the destination mail address from the address list in response to the key operations through the inputting means, and for controlling the display means to display information for preparing a mail on a display screen, the information including a mail message, a subject of the mail message, and the destination mail address,
   wherein the control means controls the display means so that the destination mail address is searched on the display screen, on which the mail message and the subject of the mail message are being displayed,
   wherein the control means searches the destination mail address having a character or a character string inputted from the inputting means when searching the destination mail address,
   wherein the storage means stores an address list set including a plurality of address lists and names of the address lists, and
   wherein the address list set includes at least one of an address book, an address list extracted from a sent mail history, an address list extracted from a received mail history, and a list of a group address for sending a single mail to a plurality of destination mail addresses.

2. A portable terminal including a function for transmitting a mail, said portable terminal comprising:
   a display unit;
   a storage device for storing an address list including a plurality of mail addresses;
   an inputting unit for receiving key operations by a user of the portable terminal for searching and entering a destination mail address; and
   a controller for searching the destination mail address from the address list in response to the key operations through the inputting unit, and for controlling the display unit to display information for preparing a mail on a display screen, the information including a mail message, a subject of the mail message, and the destination mail address,
   wherein the controller controls the display unit so that the destination mail address is searched on the display screen on which the mail message and the subject of the mail message are being displayed,
   wherein the controller searches the destination mail address having a character or a character string inputted from the inputting unit when searching the destination mail address,
   wherein the storage device stores an address list set including a plurality of address lists and names of the address lists, and
   wherein the address list set includes at least one of an address book, an address list extracted from a sent mail history, an address list extracted from a received mail history, and a list of a group address for sending a single mail to a plurality of destination mail addresses.

3. The portable terminal according to claim 1, wherein the control means selects each of destination mail addresses in the address list sequentially and cyclically in a predetermined order in response to the key operations through the inputting means, and
   wherein a candidate of the destination mail address is displayed in a destination mail address field in the display screen, and the candidate is replaced by a next candidate in response to the key operations.

4. The portable terminal according to claim 1,
   wherein the inputting means receives the key operations through the inputting means to select one of the address lists from the address list set stored in the storage means, searches the destination mail address from the selected address list in response to the key operations through the inputting means, and controls the display means to display the name of the selected address list on the display screen in which the mail message and the subject of the mail message are displayed.

5. The portable terminal according to claim 1, wherein the display means displays the address list, the mail message, and the subject of the mail message on said display screen.

6. The portable terminal according to claim 1, wherein the display means does not display another screen that displays the address list before displaying said display screen.

7. The portable terminal according to claim 1, wherein the display means displays a plurality of operation screens, said display screen being one of said plurality of operation screens.

8. The portable terminal according to claim 1, wherein the control means searches the destination mail address from addresses each having a character or a character string, which partially matches with the character or the character string inputted from the inputting means.

9. The portable terminal according to claim 1, wherein the control means searches the destination mail address from addresses each corresponding to an appellation or a registered name, which has a character or a character string partially matching with the character or the character string inputted from the inputting means.

10. The portable terminal according to claim 1, wherein the control means determines a selection of the destination address from one of the address book, the address list extracted from the sent mail history, and the address list extracted from the received mail history.

11. The portable terminal according to claim 2, wherein the controller selects each of destination mail addresses in the address list sequentially and cyclically in a predetermined order in response key operations through the inputting unit, and wherein a candidate of the destination mail address is displayed in a destination mail address field in the display screen, and the candidate is replaced by a next candidate in response to the key operations.

12. The portable terminal according to claim 2, wherein the inputting unit receives the key operations through the inputting unit to select one of the address lists from the address list set stored in the storage device searches the destination mail address from the selected address list in response to the key operations through the inputting unit, and controls the display unit to display the name of the selected address list on the display screen in which the mail message and the subject of the mail message are displayed.

13. The portable terminal according to claim 2, wherein the display unit displays at list the address list, the mail message, and the subject of the mail message on said display screen.

14. The portable terminal according to claim 2, wherein the display unit does not display an other screen that displays the address list before displaying said display screen.

15. The portable terminal according to claim 2, wherein the display unit displays a plurality of operation screens, said display screen being one of said plurality of operation screens.

16. The portable terminal according to claim 2, wherein the controller determines a selection of the destination address from one of the address book, the address list extracted from the sent mail history, and the address list extracted from the received mail history.

17. The portable terminal according to claim 4, wherein the control means selects each of the address lists sequentially and cyclically in a predetermined order from the address list set stored in the storage means in response to the key operations.

18. The portable terminal according to claim 7, wherein the plurality of operation screens displays at least an address list of the received mail history, an address list of the sent mail history, and the list of the group address for sending the single mail.

19. The portable terminal according to claim 7, wherein in said searching and said entering the destination mail address, an operation screen from the plurality of operation screens is selected in response to the key operations.

20. The portable terminal according to claim 12, wherein the controller selects each of the address lists sequentially and cyclically in a predetermined order from the address list set stored in the storage device in response to the key operations.

21. The portable terminal according to claim 15, wherein the plurality of operation screens displays at least an address list of the received mail history, an address list of the sent mail history, and the list of the group address for sending the single mail.

22. The portable terminal according to claim 15, wherein in said searching and said entering the destination mail address, an operation screen from the plurality of operation screens is selected in response to the key operations.

* * * * *